US012709071B2

(12) United States Patent
Iwanaga

(10) Patent No.: US 12,709,071 B2
(45) Date of Patent: Aug. 18, 2026

(54) JOINING METHOD

(71) Applicant: MITSUBISHI HEAVY INDUSTRIES, LTD., Tokyo (JP)

(72) Inventor: Tomoya Iwanaga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 79 days.

(21) Appl. No.: 18/815,850

(22) Filed: Aug. 27, 2024

(65) Prior Publication Data

US 2025/0083396 A1 Mar. 13, 2025

(30) Foreign Application Priority Data

Sep. 12, 2023 (JP) ................................ 2023-147397

(51) Int. Cl.
*B29C 65/00* (2006.01)
*B29C 65/02* (2006.01)
(Continued)

(52) U.S. Cl.
CPC .......... *B29C 66/7212* (2013.01); *B29C 65/02* (2013.01); *B29C 66/05* (2013.01);
(Continued)

(58) Field of Classification Search
CPC .................. B29C 51/267; B29C 48/21; B29C 2045/0072; B29C 44/569; B29C 43/20;
(Continued)

(56) References Cited

U.S. PATENT DOCUMENTS 6,284,089 B1 * 9/2001 Anderson ........... B29C 66/8242 156/304.6
2007/0077397 A1 * 4/2007 Saiz .................... B29C 66/1122 428/167

(Continued)

FOREIGN PATENT DOCUMENTS

EP 2988920 B1 3/2020
JP H05-124042 A 5/1993

(Continued)

OTHER PUBLICATIONS

Extended European Search Report for European Application No. 24194519.5 dated on Feb. 10, 2025; 7 pp.

(Continued)

*Primary Examiner* — Stella K Yi
(74) *Attorney, Agent, or Firm* — HAUPTMAN HAM, LLP

(57) ABSTRACT

A joining method using heat fusion includes layering a first joining body and a second joining body having a smaller plane area than the first joining body; and performing heating and pressurization with a heater from a side of the second joining body. The method further includes a resin dam interposed between the second joining body and the heater. The resin dam includes a base body having one of front and back surfaces in contact with the heater and the other of front and back surfaces in contact with the second joining body; and a dam main body extending from a circumferential edge of the base body in a direction away from the base body and having a shape control surface facing a side surface of the second joining body.

5 Claims, 7 Drawing Sheets

(51) Int. Cl.
*B29K 105/12* (2006.01)
*B29K 307/04* (2006.01)

(52) U.S. Cl.
CPC .......... *B29C 66/45* (2013.01); *B29K 2105/12* (2013.01); *B29K 2307/04* (2013.01)

(58) Field of Classification Search
CPC ... B29C 2043/189; B29C 66/45; B29C 66/05; B29C 66/7212
See application file for complete search history.

(56) References Cited

U.S. PATENT DOCUMENTS

2020/0061952 A1* 2/2020 Nakayama ........ B29C 45/14336
2020/0298500 A1 9/2020 Koehn et al.

FOREIGN PATENT DOCUMENTS

JP H11-001210 A 1/1999
JP 2018012108 A 1/2018

OTHER PUBLICATIONS

Japan Patent Office, Notice of Reasons for Refusal for Japanese Patent Application No. 2023-147397 mailed on Jan. 6, 2026; 6 pp.

* cited by examiner

JOINING METHOD

CROSS-REFERENCE TO RELATED APPLICATIONS

This application claims the benefit of priority to Japanese Patent Application Number 2023-147397 filed on Sep. 12, 2023. The entire contents of the above-identified application are hereby incorporated by reference.

TECHNICAL FIELD

The present disclosure relates to a method of joining thermoplastic composite members by heat fusion.

RELATED ART

For example, heat transfer fusion is known as a heat fusion technique for a thermoplastic composite member used as a structural material of an aircraft. In the heat transfer fusion, a heater is brought into contact with an outer surface of the thermoplastic composite member, heat generated by the heater is transferred to the inside of the material, and pressure is applied while melting a fusion interface until the melting point is exceeded. Typically, a thermoplastic composite member used as a structural material of an aircraft is made of carbon fiber reinforced thermoplastics (CFRTP).

Since the temperature is increased to a temperature exceeding the melting point in a pressurized state during the heat fusion, fibers and a resin may be extruded outward from a circumferential edge of a member to be fused as illustrated in FIG. 7, for example. The plate thickness of the joined member with such extrusion is reduced more than desired, or the strength thereof is reduced because the fiber volume content (Vf) is reduced more than desired. In addition, the extruded portion interferes with other members and fails to assemble them in a subsequent process, or the extruded portion falls off and causes contamination.

For example, JP H05-124042 A discloses a molding die for a thermoplastic composite material. In the molding die, at least a part of a cavity formed by an upper die and a lower die is opened, and cooling fins are provided at end portions of the opened cavity so as to be continuous with a molding surface of each of the upper die and the lower die.

JP H11-1210 A proposes that, when thermoplastic plastics on which aluminum foil is laminated are caused to come into contact with each other and welded, first stage pressurizing compression is performed at a low pressure, and then second stage pressurizing compression is performed at a pressure higher than the pressure in the first stage pressurizing compression.

SUMMARY

JP H05-124042 A relates to a technique for molding a single thermoplastic composite member and does not suggest heat fusion of two layered thermoplastic composite members.

JP H11-1210 A discloses heat fusion of two thermoplastic composite members. However, In JP H11-1210 A, thermoplastic plastic at a joined portion is pushed out to the inner side direction of a flange, a resin pool of the thermoplastic plastic is formed on the inner side, and the thermoplastic plastic is sealed, thereby obtaining a seal layer having a strong adhesive force. Therefore, JP H11-1210 A does not suggest the above-described extrusion.

In view of the above, an object of the present disclosure is to control a shape of extrusion that occurs during heat fusion of two thermoplastic composite members.

A joining method according to the present disclosure includes: a first step of layering a first joining body and a second joining body having a smaller plane area than the first joining body; and a second step of performing heating and pressurization with a heater from a side of the second joining body. In the second step, a resin dam is interposed between the second joining body and the heater.

The resin dam includes: a base body having one of front and back surfaces in contact with the heater and the other of front and back surfaces in contact with the second joining body; and a dam main body extending from a circumferential edge of the base body in a direction away from the base body and having a shape control surface facing a side surface of the second joining body.

The present disclosure can control, by performing heat fusion in a state where the resin dam is interposed between the second joining body and the heater, the shape of extrusion. Therefore, the present disclosure can reduce, even when extrusion occurs, adverse effects due to the extrusion.

BRIEF DESCRIPTION OF DRAWINGS

The disclosure will be described with reference to the accompanying drawings, wherein like numbers reference like elements.

DESCRIPTION OF EMBODIMENTS

An embodiment will be described below with reference to the accompanying drawings.

The embodiment relates to a method and an apparatus for joining thermoplastic composite materials, such as carbon fiber reinforced thermoplastic plastics (hereinafter CFRTP) by heat fusion. An object of the joining method according to the present embodiment is to reduce adverse effects due to extrusion of a resin by controlling, for example, a shape in which the resin containing fibers is extruded from a joined boundary portion of two CFRTP members.

Figure 1:
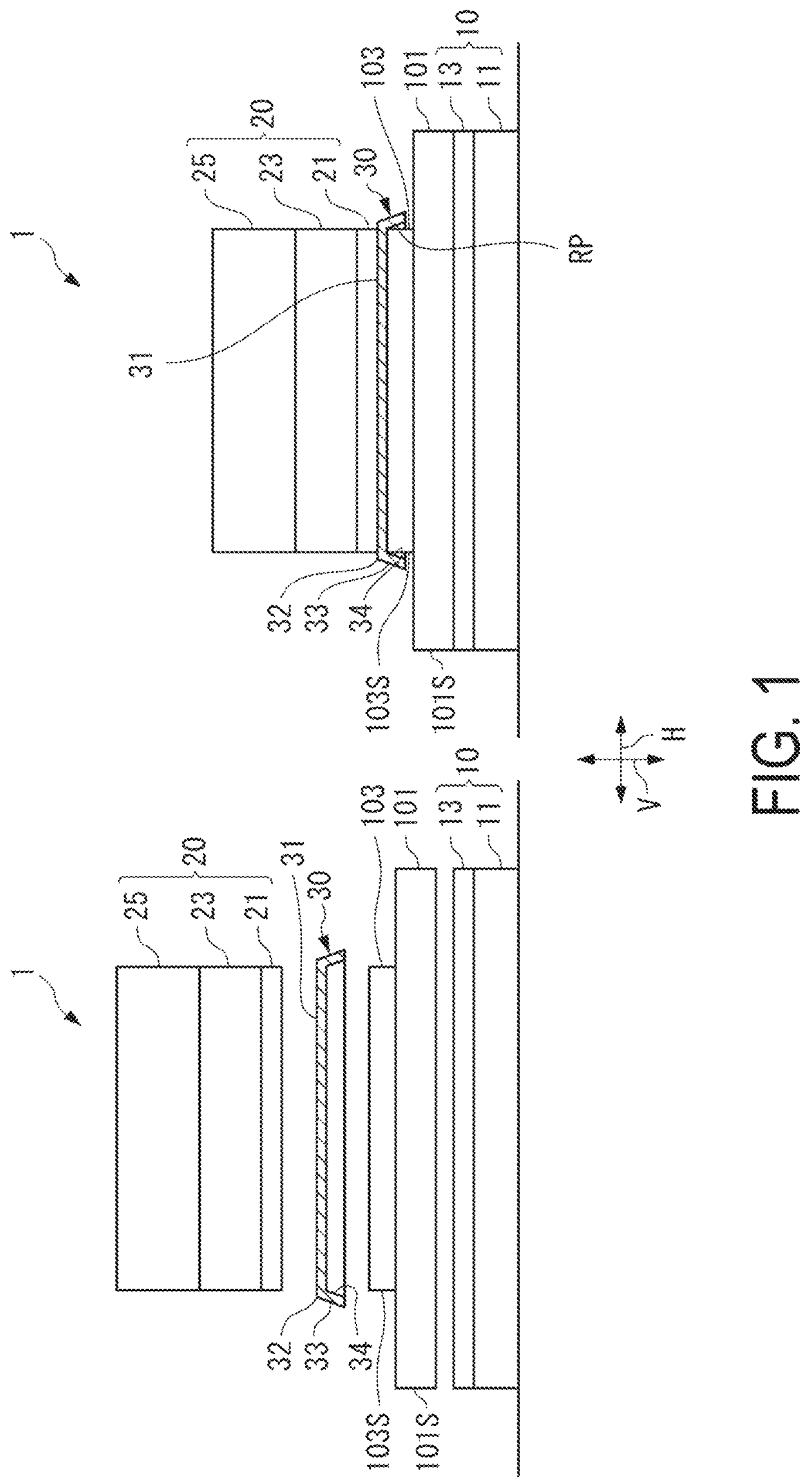
FIG. 1 is a side view illustrating a configuration of an apparatus executing a heat fusion method according to an embodiment.

Example of Heat Fusion: See FIG. 1

In the present embodiment, for example, a first joining body 101 and a second joining body 103, each of which is made of CFRTP and has a flat shape, are joined by heat fusion. As illustrated in the drawing, the first joining body 101 and the second joining body 103 in the present embodiment are different from each other in a plane area which is an area in a planar direction, and the second joining body 103 is smaller than the first joining body 101. The second joining body 103 is placed on the first joining body 101, and a step occurs between the second joining body 103 and the first joining body 101. Although the details will be described below, a resin extrusion from the step portion occurs. The first joining body 101 and the second joining body 103 may be CFRTPs containing the same type of resin or may be CFRTPs containing different types of resins. A side surface 101S of the first joining body 101 and a side surface 103S of the second joining body 103 extend along a vertical direction V.

Heat Fusion Apparatus 1: See FIG. 1

The first joining body 101 and the second joining body 103 are joined to each other by the heat fusion apparatus 1.

The heat fusion apparatus 1 includes a first element 10 provided on the lower side of the first joining body 101 and the second joining body 103 in the vertical direction V, and a second element 20 provided on the upper side of the first joining body 101 and the second joining body 103 in the vertical direction V. In the case of the present embodiment, the second joining body 103 in contact with the second element 20 including a heater 21 is heated and melted so as to be heat-fused to the first joining body 101.

The first element 10 includes a press platen 11 and a heat insulator 13 placed on the press platen 11.

The press platen 11 is required to have a rigidity enough to receive a load applied during the heat fusion and not to be deformed by the load. The press platen 11 is appropriately selected from, for example, a metal material and a ceramic material.

The heat insulator 13 is provided to suppress a decrease in the temperature of the first joining body 101 heated for the heat fusion. In order to achieve this object, preferably, the heat insulator 13 is made of a material having a low thermal conductivity, for example, 1.0 W/m. K or less, and has a heat resistance at a temperature of 400° C., and is made of, for example, a heat insulator containing glass fibers as a base material. The same applies to a heat insulator 23 of the second element 20.

The second element 20 includes the heater 21, the heat insulator 23 placed on the heater 21, a pressurizing block 25 placed on the heat insulator 23, and a resin dam 30 that controls the shape of the extruded resin.

The heater 21 is appropriately selected from, for example, a sheet-like graphite heater that generates heat when supplied with electric power, a carbon heater using carbon fibers as a heat generator, a ceramic heater using alumina ($Al_2O_3$), silicon nitride ($Si_3N_4$), or the like as a heat generator, and a thin metal film heater. For the heat fusion of CFRTPs, it is desired that the heater 21 increases the temperature to a temperature of 400° C. or higher.

The pressurizing block 25 applies a load to the first joining body 101 and the second joining body 103 via the heater 21 and the heat insulator 23.

In the heat fusion apparatus 1, joining by the heat fusion is performed through the first step and the second step performed after the first step described below. After the second step, cooling such as air cooling is performed.

First step: the first joining body 101 and the second joining body 103 having a plane area smaller than the first joining body 101 are layered such that the second joining body 103 is on the upper side.

Second step: Heating and pressurization are performed by the heater 21 from the side of the second joining body 103.

Figure 2:
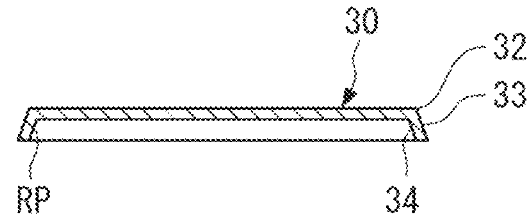
FIG. 2 is a plan view illustrating the apparatus of FIG. 1.
Figure 2:
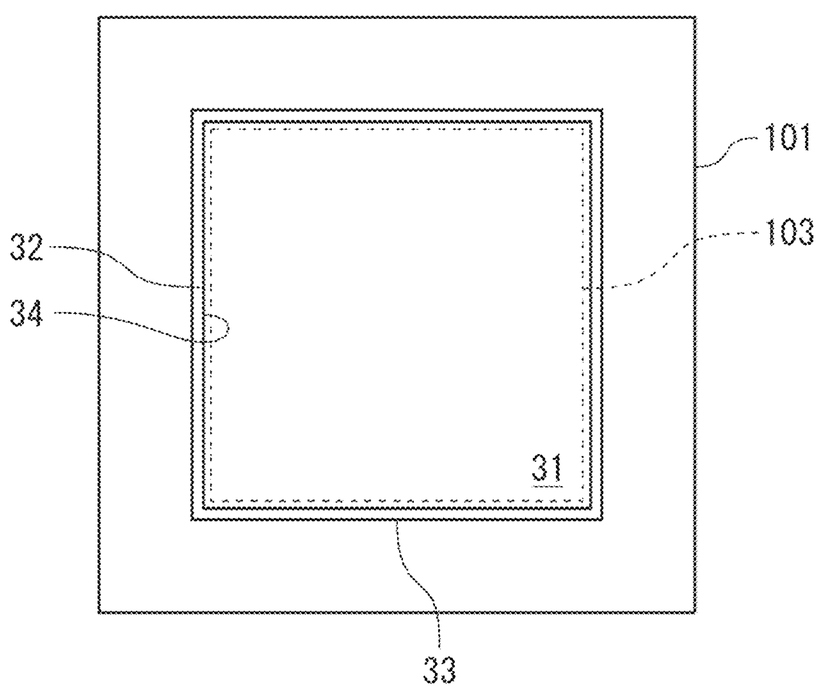

Resin Dam 30: See FIGS. 1 and 2

The resin dam 30 includes a base body 31 having a flat rectangular shape in plan view, and a dam main body 33 projecting outward from a circumferential edge 32 of the base body 31 and extending in a direction away from the base body 31. The resin dam 30 is integrally formed, for example, by press-forming a board made of copper or a copper alloy into the base body 31 and the dam main body 33. The resin dam 30 is provided on the side of the second joining body 103 to be heated and melted by the heater 21.

Base Body 31: See FIGS. 1 and 2

As will be described below, the base body 31 is an element that applies heat and pressure necessary for joining the first joining body 101 and the second joining body 103 by the heat fusion. Thus, the amount of heat generated by the heater 21 is transmitted to the second joining body 103 particularly through the base body 31 of the resin dam 30. Therefore, the resin dam 30 is made of, for example, a copper alloy having excellent thermal conductivity and small heat capacity. Considering that the resin dam 30 has a rigidity required to uniformly transmit a load by the pressurizing block 25 to the second joining body 103 and the first joining body 101 in the planar direction and has a small decrease in strength due to softening even at an increased temperature of about 400 to 500° C., a metal material other than copper or a copper alloy, for example, an iron-based material such as steel or stainless steel or an Fe—Ni alloy can be used for the resin dam 30.

Dam Main Body 33: See FIGS. 1 and 2

The dam main body 33 is an element that controls the shape of an extruded resin. Since this resin is derived from CFRTP and thus contains fibers, the resin dam in the present disclosure refers to a member that controls the shape of the extruded resin containing fibers.

At a predetermined position at which the resin dam 30 is held between the heater 21 and the second joining body 103, the dam main body 33 is inclined with respect to the vertical direction V. Thus, a gap is formed between the side surface 103S of the second joining body 103 parallel to the vertical direction V and the dam main body 33. This gap has a shape whose dimension in the horizontal direction H increases from the upper side toward the lower side. Since the resin extruded from the side surface 103S of the second joining body 103 during the heat fusion stays in this gap, this gap is referred to as a resin pool RP. The shape of the extruded resin staying in the resin pool RP in the horizontal direction H follows the shape of a shape control surface 34 which is an inner side surface of the dam main body 33. In a cross-section in the vertical direction V, the extruded resin staying in the resin pool RP has a substantially triangular cross-sectional shape widening toward the lower side, similar to the shape of the resin pool RP. This shape can be regarded as a mechanical element called a fillet. Regarding the resin pool RP, only the extruded resin has been mentioned, but this resin is derived from CFRTP and thus contains fibers. That is, the resin pool RP in the present disclosure refers to a region in which the resin containing fibers is accumulated.

Figure 3:
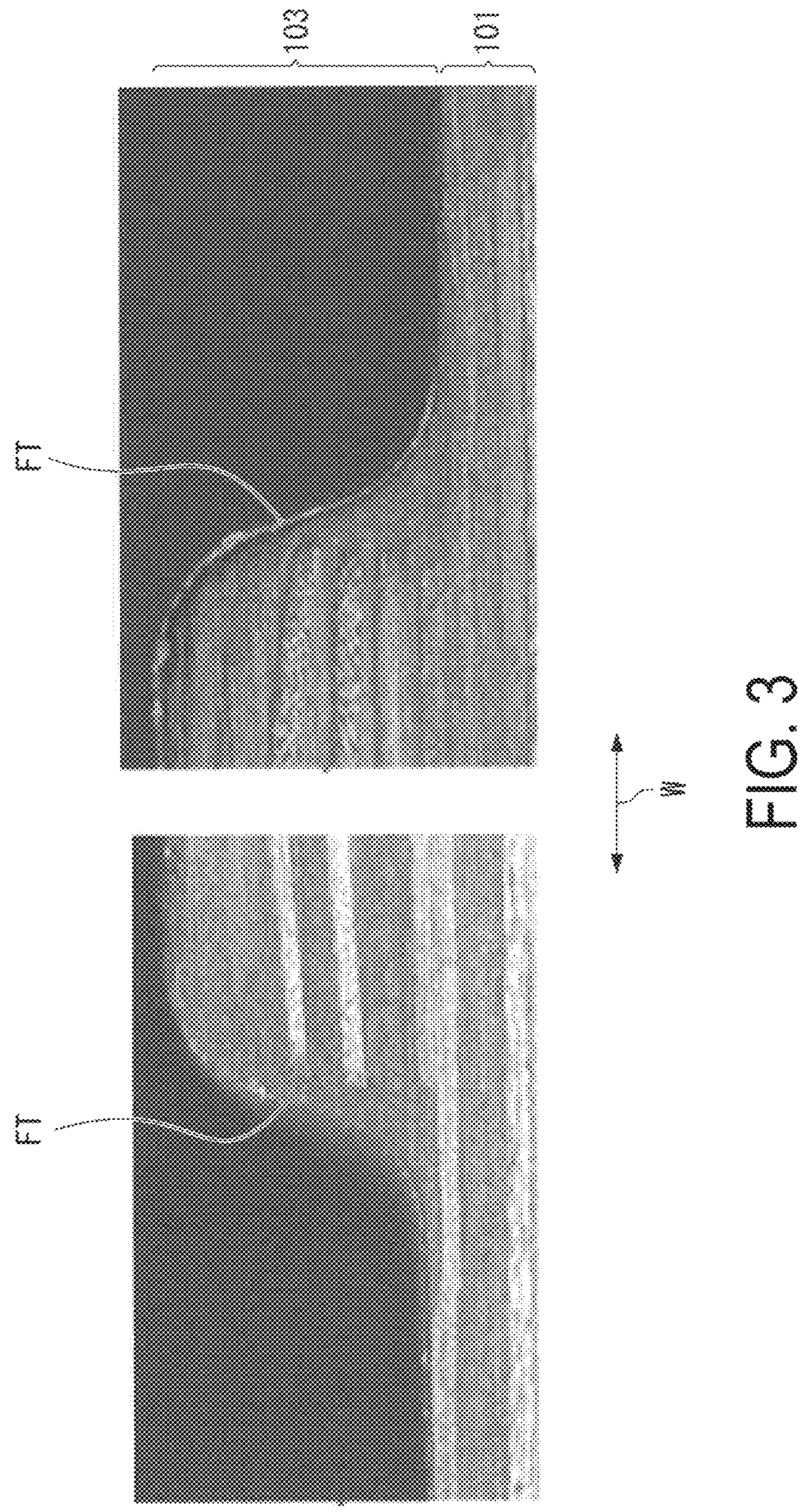
FIG. 3 is a diagram illustrating a joined body obtained by heat fusion of the embodiment.

FIG. 3 illustrates an example of a fillet FT obtained by performing the heat fusion using the resin dam 30. The fillet FT is formed on the side of the second joining body 103 on which the heater 21 is provided, and is continuously widened in a width direction W from the upper surface of the second joining body 103 toward the first joining body 101. The fillet FT is recessed in an arc shape at a boundary portion with the first joining body 101 and protrudes in an arc shape at an upper end of the second joining body 103 in the drawing.

Figure 4:
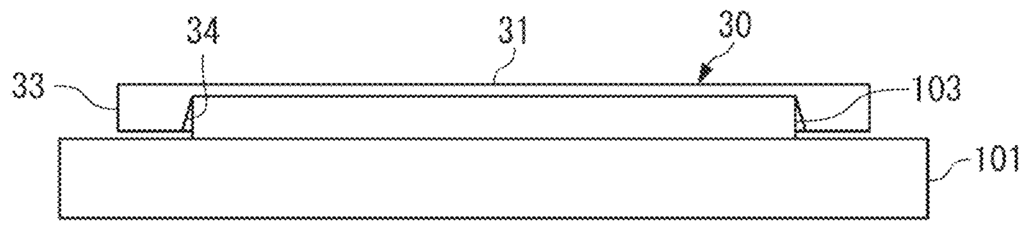
FIG. 4 is a diagram illustrating a plurality of modification examples included in the embodiment in a state before the heat fusion.
Figure 4:
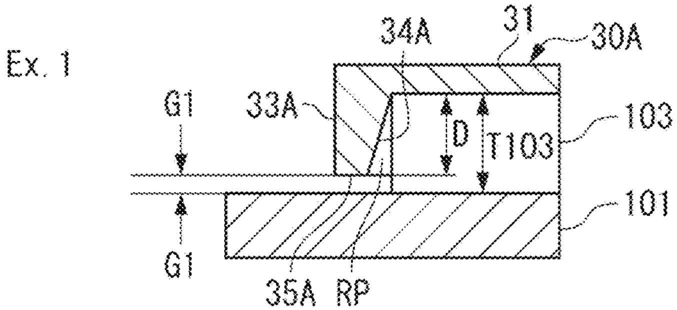
Figure 4:
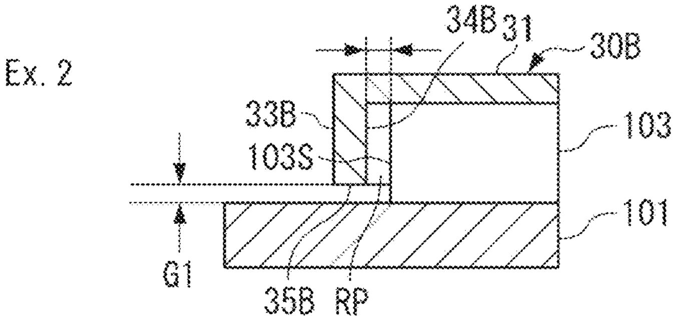
Figure 4:
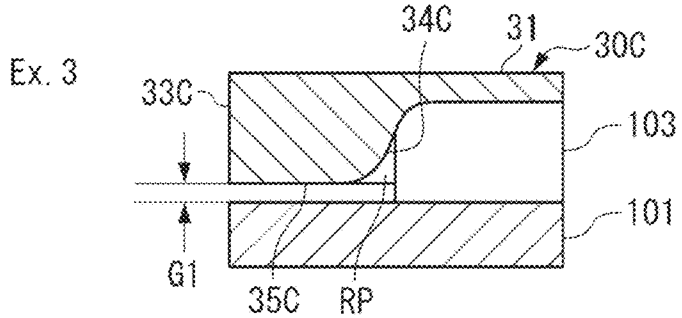
Figure 4:
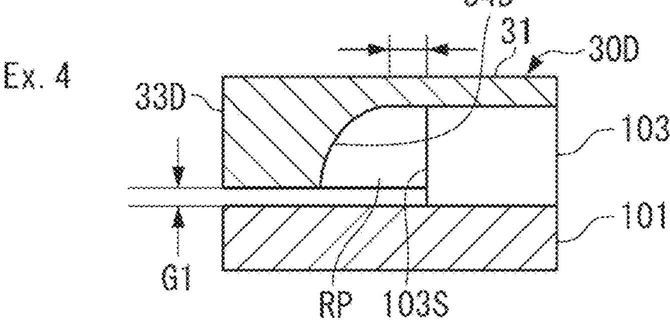

Various Shapes of Resin Dam 30: See FIGS. 4 and 5

The shape of the resin dam 30 described above is merely an example, and the present disclosure tolerates other resin dams 30. Among them, four examples (resin dams 30A to 30D) will be described with reference to FIGS. 4 and 5.

Resin Dam 30A

First, in the resin dam 30A, only an inner surface of a dam main body 33A is inclined with respect to the side surface 103S of the second joining body 103. The fillet FT illustrated in FIG. 3 can also be formed in the resin dam 30A.

In the resin dam 30A, when the base body 31 of the resin dam 30A is placed on the second joining body 103, a lower end 35A of the dam main body 33A in the drawing is separate from the first joining body 101, and a gap G1 occurs between the first joining body 101 and the lower end 35A. That is, a depth D of the resin dam 30A, which is a distance from the lower end 35A of the resin dam 30A to the base body 31, and a thickness T103 of the second joining body 103 have a relationship of D<T103. This relationship also true in the resin dams 30B to 30D described below. The thickness of the second joining body 103 is reduced after the heat fusion, and the gap G1 is determined in accordance with the degree of decrease in the thickness.

Resin Dam 30B

Next, in the resin dam 30B, a dam main body 33B is not inclined with respect to the side surface 103S but is parallel thereto. That is, the dam main body 33B of the resin dam 30B hangs down from the base body 31 at a right angle, and a shape control surface 34B is also parallel to the side surface 103S. A gap is provided between the dam main body 33B and the side surface 103S even at the upper end of the dam main body 33B, and the gap constitutes the resin pool RP. The dimension of the resin pool RP in the horizontal direction H is constant along the vertical direction V. Note that the dimensions of the resin pools RP in the resin dams 30A, 30C, and 30D in the horizontal direction H increase from the upper side toward the lower side in the vertical direction V.

Resin Dam 30C

Next, in the resin dam 30C, a shape control surface 34C of a dam main body 33C is formed of a rounded surface having an arc shape. The shape control surfaces 34A and 34B of the resin dams 30A and 30B are formed of flat surfaces.

In addition, in the resin dam 30C, a lower end of the dam main body 33C, which is continuous with the shape control surface 34 and faces the second joining body 103, is extended. This extended portion constitutes a pressing surface 35C having a flat shape that presses a region of the first joining body 101 to be melted by radiant heat and heat transfer during the heat fusion. The heat fusion is promoted by pressurization with the pressing surface 35C. Note that, while the resin dams 30A and 30B also have pressing surfaces, the pressing surface 35C has a larger area to press the first joining body 101.

Resin Dam 30D

The resin dam 30D has the same basic shape as the resin dam 30C. However, the volume of the resin pool RP is larger in the resin dam 30D than in the resin dam 30C. Thus, a base body 31D of the resin dam 30D is formed to have a larger plane area than the base body 31 of the resin dam 30C, and a gap G2 is provided from the side surface 103S of the second joining body 103 to the boundary between the base body 31 and the dam main body 33D.

Example of Extrusion of Resin: See FIG. 7

Figure 7:
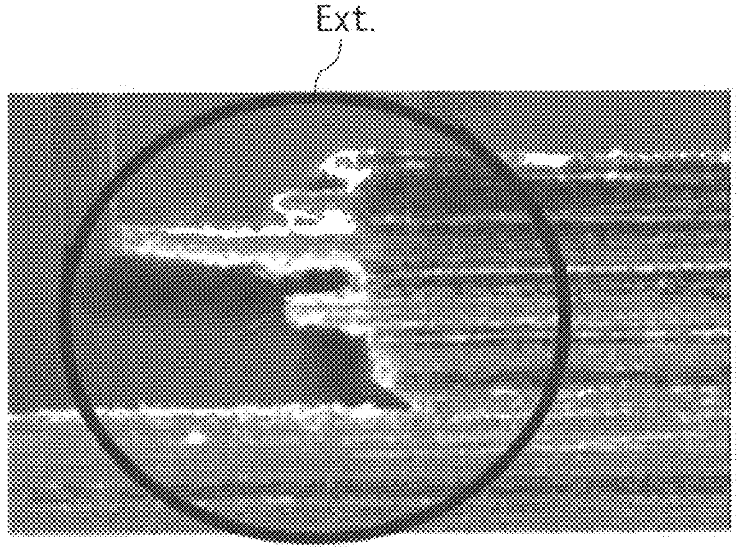
FIG. 7 is a diagram illustrating an example of extrusion.
Figure 7:
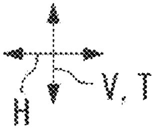

When the second joining body 103 is heat-fused to the first joining body 101 with the side surface 103S in a free state without using the resin dam 30A or the like, the amount of extrusion Ext. increases toward the center in a thickness direction T, and the shape of the extrusion Ext. includes large irregularities as illustrated in FIG. 7. When the extrusion is formed in such a shape, the extrusion cannot contribute to the strength and may fall off to cause contamination. Further, since the extrusion of the resin containing fibers occurs without restriction, the thickness of the second joining body 103 may be unexpectedly reduced.

Controlled Shape of Extruded Resin by Resin Dams 30A to 30D: See FIG. 5

Figure 5:
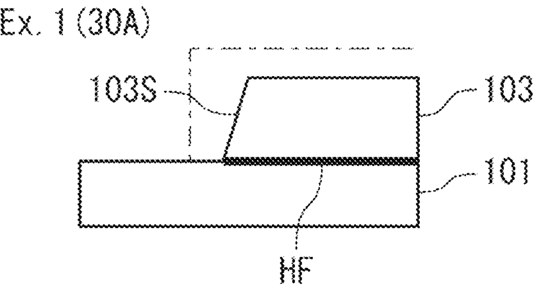
FIG. 5 is a diagram illustrating the plurality of modification examples included in the embodiment in a state after the heat fusion.
Figure 5:
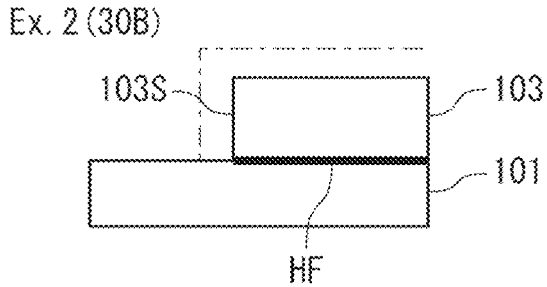
Figure 5:
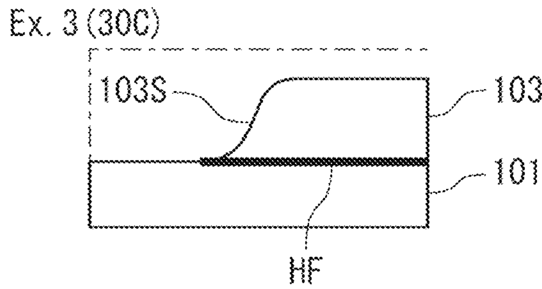
Figure 5:
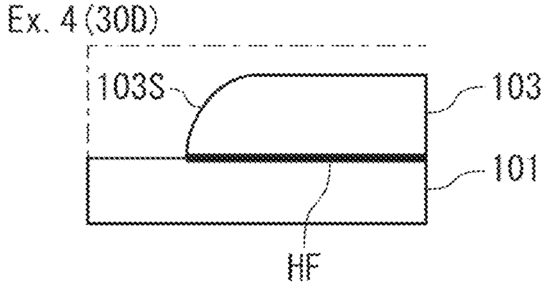

In the first joining body 101 and the second joining body 103 joined by a heat fusion layer HF, the shapes of extruded resins formed by the resin dams 30A to 30D are as illustrated in FIG. 5, and the portions corresponding to the side surface 103S after the heat fusion are formed of smooth surfaces with less irregularities. That is, the side surface 103S of the second joining body 103 formed by the resin dam 30A is a flat surface that is inclined with respect to the thickness direction of the first joining body 101 so as to follow the shape control surface 34A of the dam main body 33A. The side surface 103S formed by the resin dam 30B is a flat surface that is parallel to the thickness direction so as to follow the shape control surface 34B of the dam main body 33B. The side surfaces 103S formed by the resin dams 30C and 30D have arc-shaped and rounded surfaces following the shape control surfaces 34C and 34D of the dam main bodies 33C and 33D, respectively.

As described above, also in the present embodiment, although the extrusion occurs after the heat fusion, the shape of the extruded portion can be controlled, and thus there is no possibility of the extruded portion falling off. In addition, by controlling the shape of the extruded portion, the extrusion amount of the resin containing fibers can also be controlled, and thus the reduction in the thickness can be suppressed as expected.

Figure 6:
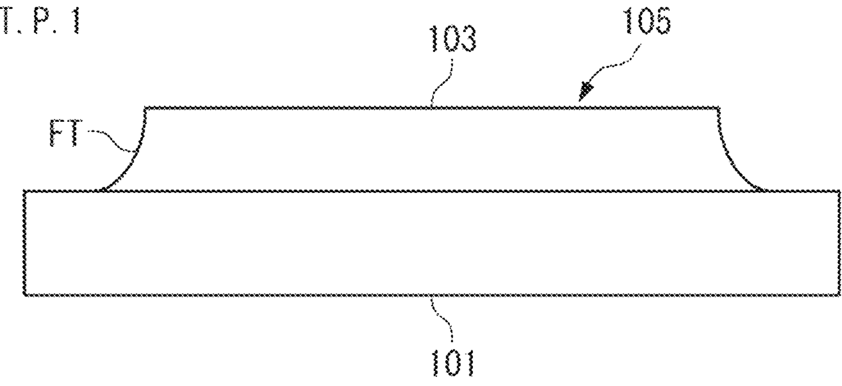
FIG. 6 illustrates joined bodies according to the embodiment, where the upper one includes a fillet and the lower one includes no fillet.
Figure 6:
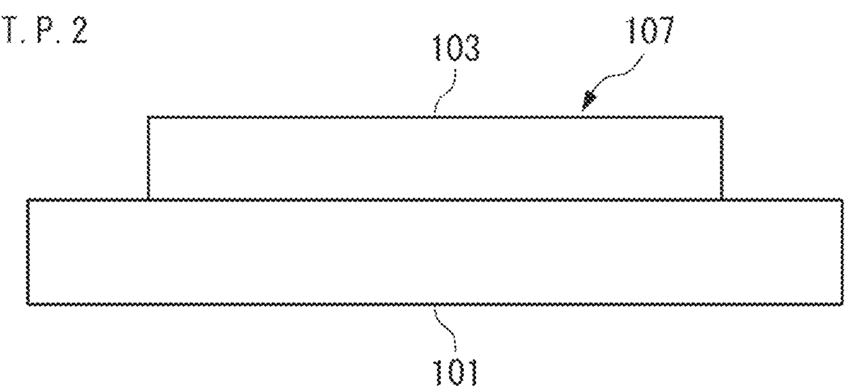

Effect of Improving Joining Strength by Fillet FT: See FIG. 6

The shapes of the extruded resins formed by the resin dams 30B to 30D are so-called fillets FT, and contribute to improvement of the joining strength between the first joining body 101 and the second joining body 103. For example, the shear strength of a joined body 105 in which the side surface 103S of the second joining body 103 includes the fillet FT and the shear strength of a joined body 107 in which the side surface 103S does not include the fillet FT were measured. As a result, it was confirmed that the joined body 105 including the fillet FT had a higher shear strength than the joined body 107 by 9%.

Besides the above-described embodiment, configurations explained in the above-described embodiment can be selected or omitted as desired or can be changed to other configurations as necessary.

For example, although an example in which the plane areas of two joining bodies are different from each other has been described in the embodiment, the present disclosure may be applied to a case in which the plane areas of two joining bodies are equal to each other. In that case, the resin dam is provided at a joining body on the side on which the heater is provided. The embodiment describes an example in which the first joining body 101 having a large plane area is disposed on the lower side and the second joining body 103 having a small plane area is disposed on the upper side, but in the present disclosure, a joining body having a small plane area may be disposed on the lower side, and a joining body having a large plane area may be disposed on the upper side. In that case, the joining body having a small plane area disposed on the lower side can be placed on the resin dam, and the heater can be disposed on the lower side of the resin dam.

Further, in the embodiment, the heater is provided at only one of the two joining bodies, but the heater may be provided at both of the two joining bodies. In that case, the resin dam is provided at both of the two joining bodies.

Supplementary Notes

The joining method described in the embodiment is grasped as follows.

Supplementary Note 1

The joining method includes: a first step of layering a first joining body (101) and a second joining body (103) having a smaller plane area than the first joining body (101); and a second step of performing heating and pressurization with a heater (21) from a side of the second joining body (103). In the second step, a resin dam (30) is interposed between the second joining body (103) and the heater (21). The resin dam (30) includes: a base body (31) having one of front and back surfaces in contact with the heater (21) and the other of front and back surfaces in contact with the second joining body (103); and a dam main body (33) extending from a circumferential edge (32) of the base body (31) in a direction away from the base body (31) and having a shape control surface (34) facing a side surface (103S) of the second joining body (103).

Supplementary Note 2

In Supplementary Note 1, preferably, a resin pool (RP) is provided between the shape control surface (34) and the side surface (103S).

Supplementary Note 3

In Supplementary Note 1, preferably, the shape control surface (34) is widened toward a direction away from the base body (31).

Supplementary Note 4

In Supplementary Note 1, preferably, the shape control surface (34) is rounded.

Supplementary Note 5

In Supplementary Note 1, preferably, an end portion (35A) of the dam main body (33) facing the first joining body (101) is separate from the first joining body (101), and a gap (G1) occurs between the first joining body (101) and the end portion (35A).

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A joining method using heat fusion, the joining method comprising:

a first step of layering a first joining body and a second joining body having a smaller plane area than the first joining body; and a second step of performing heating and pressurization with a heater from a side of the second joining body, wherein in the second step, a resin dam is interposed between the second joining body and the heater, and the resin dam includes a base body having one of front and back surfaces in contact with the heater and the other of front and back surfaces in contact with the second joining body and a dam main body extending from a circumferential edge of the base body in a direction away from the base body and having a shape control surface facing a side surface of the second joining body, wherein each of the first joining body and the second joining body is made of a thermoplastic composite material, the second joining body is heated and melted so as to be heat-fused to the first joining body, and the resin dam controls a shape of a resin that is extruded from the second joining body.

2. The joining method according to claim 1, wherein a resin pool is provided between the shape control surface and the side surface.

3. The joining method according to claim 1, wherein the shape control surface is widened toward a direction away from the base body.

4. The joining method according to claim 1, wherein the shape control surface is rounded.

5. The joining method according to claim 1, wherein an end portion of the dam main body facing the first joining body is separate from the first joining body, and a gap occurs between the first joining body and the end portion.

* * * * *